United States Patent
Deogun et al.

(10) Patent No.: US 11,206,707 B2
(45) Date of Patent: Dec. 21, 2021

(54) METHODS AND SYSTEMS FOR REPORTING A SECONDARY NODE FAILURE IN DUAL CONNECTIVITY NETWORKS

(71) Applicant: Samsung Electronics Co., Ltd, Suwon-si (KR)

(72) Inventors: Pravjyot Singh Deogun, Bangalore (IN); Jungsoo Jung, Suwon-si (KR); Neha Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 16/610,882

(22) PCT Filed: May 4, 2018

(86) PCT No.: PCT/KR2018/005199
§ 371 (c)(1),
(2) Date: Nov. 4, 2019

(87) PCT Pub. No.: WO2018/203710
PCT Pub. Date: Nov. 8, 2018

(65) Prior Publication Data
US 2021/0153281 A1    May 20, 2021

(30) Foreign Application Priority Data

May 4, 2017    (IN) .............................. 201741015839
Apr. 17, 2018  (IN) .............................. 201741015839

(51) Int. Cl.
*H04W 16/14*    (2009.01)
*H04W 76/18*    (2018.01)
(Continued)

(52) U.S. Cl.
CPC ........... *H04W 76/18* (2018.02); *H04W 24/10* (2013.01); *H04W 76/15* (2018.02); *H04W 76/19* (2018.02);
(Continued)

(58) Field of Classification Search
None
See application file for complete search history.

(56) References Cited

U.S. PATENT DOCUMENTS

2013/0051214 A1* 2/2013 Fong ................... H04W 36/30
                                                        370/216
2015/0223282 A1* 8/2015 Vajapeyam .......... H04W 76/19
                                                        370/221
(Continued)

FOREIGN PATENT DOCUMENTS

| EP | 3101992 A1 | 12/2016 |
| EP | 3585129 A1 | 12/2019 |
| WO | 2015/116877 A1 | 8/2015 |

OTHER PUBLICATIONS

International Search Report dated Aug. 17, 2018 in connection with International Patent Application No. PCT/KR2018/005199, 3 pages.
(Continued)

*Primary Examiner* — Sithu Ko (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The embodiments herein disclose methods and systems for enabling a user equipment (UE) to report a
(Continued)

secondary node failure in a dual connectivity wireless network including a master node (MN) and a secondary node (SN), the method includes detecting a secondary cell group (SCG) failure.

15 Claims, 5 Drawing Sheets

(51) Int. Cl.
| | | |
|---|---|---|
| *H04W 76/19* | (2018.01) | |
| *H04W 76/15* | (2018.01) | |
| *H04W 76/27* | (2018.01) | |
| *H04W 24/10* | (2009.01) | |
| *H04W 80/02* | (2009.01) | |
| *H04W 84/18* | (2009.01) | |

(52) U.S. Cl.
CPC .......... *H04W 76/27* (2018.02); *H04W 80/02* (2013.01); *H04W 84/18* (2013.01)

(56) References Cited

U.S. PATENT DOCUMENTS

| | | | | |
|---|---|---|---|---|
| 2015/0296468 A1* | 10/2015 | Dural | ................. | H04W 56/003 370/336 |
| 2015/0296486 A1* | 10/2015 | Park | .................... | H04W 48/00 370/329 |
| 2016/0057800 A1* | 2/2016 | Ingale | .................. | H04W 76/18 370/216 |
| 2016/0219604 A1* | 7/2016 | Fujishiro | ............... | H04W 36/04 |
| 2017/0034709 A1* | 2/2017 | Hapsari | ............... | H04W 28/085 |
| 2017/0041767 A1 | 2/2017 | Vajapeyam et al. | | |
| 2017/0055283 A1 | 2/2017 | Shrivastava et al. | | |
| 2018/0092060 A1 | 3/2018 | Won et al. | | |
| 2019/0253908 A1* | 8/2019 | Fan | ........................ | H04W 24/10 |
| 2020/0053810 A1 | 2/2020 | Lee et al. | | |
| 2020/0077312 A1* | 3/2020 | Tsuboi | .................... | H04L 5/001 |
| 2021/0068186 A1* | 3/2021 | Wu | ........................ | H04W 76/19 |

OTHER PUBLICATIONS

Written Opinion of the International Searching Authority dated Aug. 17, 2018 in connection with International Patent Application No. PCT/KR2018/005199, 7 pages.
Supplementary European Search Report in connection with European Application No. 18794075.4 dated Mar. 16, 2020, 11 pages.
Huawei, et al, "Handling on MN failure and SN failure for LTE NR tight interworking," R2-1703655, 3GPP TSG-RAN WG2 Meeting #97bis, Spokane, USA, Apr. 3-7, 2017, 4 pages.
Nokia, et al, "S-RLF with Tight Interworking," R2-1702631, 3GPP TSG-RAN WG2 Meeting #97bis, Spokane, USA, Apr. 3-7, 2017, 5 pages.
Nokia et al, "Measurement coordination for LTE-NR tight interworking," R2-1702693, 3GPP TSG-RAN WG2 Meeting #97bis, Spokane, USA, Apr. 3-7, 2017, 5 pages.
QUALCOMM Incorporated, "SCG-RLF handling in EN-DC," R2-1703569, 3GPP TSG-RAN WG2 Meeting #97bis, Spokane, USA, Apr. 3-7, 2017, 3 pages.
Samsung, "RLF Procedure for LTE-NR Interworking", 3GPP TSG-RAN WG2 NR#97bis, Apr. 3-7, 2017, R2-1703018, 3 pages.
Office Action dated Aug. 30, 2021 in connection with Korean Patent Application No. 10-2019-7035976, 10 pages.

* cited by examiner

| SCGFailureInformation | | |
|---|---|---|
| SN Configured Measurements | | |
| SCell-1 | SCell-1 result | Best neighbor result |
| SCell-2 | SCell-2 result | Best neighbor result |
| Freq-1 | List of neighbor cells and measurements | |
| Freq-2 | List of neighbor cells and measurements | |
| MN Configured Measurements | | |
| Freq-3 | List of neighbor cells and measurements | |
| Freq-4 | List of neighbor cells and measurements | |
| Freq-5 | List of neighbor cells and measurements | |

[Fig. 6]

| SCGFailureInformation | | | |
|---|---|---|---|
| Other Information | | | |
| Non-Serving Frquency Results | | | |
| ARFCN-1 | Cell Identity-1 | Measurement | |
| | Cell Identity-2 | Measurement | |
| | Cell Identity-3 | Measurement | |
| ARFCN-2 | Cell Identity-1 | Measurement | |
| ARFCN-3 | Cell Identity-1 | Measurement | |
| | Cell Identity-2 | Measurement | |
| ARFCN-4 | Cell Identity-1 | Measurement | |
| SCG Serving Frquency Results | | | |
| | SCell Identity | Measurement | PSCell |
| ARFCN-5 | Cell Identity-2 | Measurement | |
| | Cell Identity-3 | Measurement | |
| ARFCN-6 | SCell Identity | Measurement | – |
| ARFCN-7 | SCell Identity | Measurement | – |
| | Cell Identity-2 | Measurement | |
| | Cell Identity-1 | Measurement | |

METHODS AND SYSTEMS FOR REPORTING A SECONDARY NODE FAILURE IN DUAL CONNECTIVITY NETWORKS

CROSS-REFERENCE TO RELATED APPLICATIONS

This application is a 371 of International Application No. PCT/KR2018/005199 filed on May 4, 2018, which claims priority to India Patent Application No. 201741015839 filed on May 4, 2017, and India Patent Application No. 201741015839 filed on Apr. 17, 2018, the disclosures of which are herein incorporated by reference in their entirety.

BACKGROUND

1. Field

The present disclosure relates to dual connectivity networks and more particularly to reporting a secondary node failure by a user equipment (UE) to a master node (MN) in a dual connectivity wireless network for performing failure recovery actions.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Dual connectivity allows a user equipment (UE) to connect with two nodes (base stations), namely a master node (MN) and a secondary node (SN). The MN and the SN can operate on different carrier frequencies. The MN and the SN can be interconnected by backhaul links. Further, the UE can connect with a master cell group (MCG) and a secondary cell group (SCG) simultaneously by connecting to the MN and the SN respectively. The MCG and the SCG are group of cells associated with the MN and the SN respectively. There are different scenarios, where a SCG failure can occur, the UE connection with the MN can continue. The SCG failure may occur due to a radio link failure (RLF), a reconfiguration failure, an integrity check failure, and so on. For each of these failures, the UE needs to transmit a failure report to the MN in order to take appropriate actions.

According to an existing LTE SCG failure procedure, the UE includes measurement results for SCG serving frequencies and SCG cells in a LTE based SCG failure report. The measurement results can be included in the LTE based SCG failure report based on previous measurements performed by the UE according to a configuration provided by the MN. Further, in the LTE based SCG failure report, the cell identification for measurement results are based on a cell index that can be understood only by a node which has configured the given cell.

Further, in existing dual connectivity networks for example, in LTE-5G interworking, the MN may not be able to configure any measurements on some of frequencies on which the SN has configured the measurements. Also, as the MN is not able to understand the measurements configured by the SN, the UE is required to provide the failure report related to the SN configuration. However, absence of reporting the measurements related to the SN configuration in the existing dual connectivity networks may imply that the MN can configure the SCG only after an initial release of the SCG and subsequent provision of a new MN measurement configuration to the UE. Thus, extra delay may be observed from an instance of a SCG failure transmission to the measurement report transmission according to the new MN measurement configuration that can further result in high interruption in data transfer.

SUMMARY

Accordingly the embodiments provide methods and systems for reporting secondary node failure in a dual connectivity wireless network. The dual connectivity wireless network includes at least one user equipment (UE) connected to a master node (MN) and a secondary node (SN). A method includes detecting a secondary cell group (SCG) failure, wherein the SCG failure is detected by identifying a failure type. In response to detecting the SCG failure, the method includes performing a first set of failure actions. The first set of failure actions include at least one of a master cell group (MCG) split signaling radio bearer (SRB) recovery action and a radio resource control (RRC) message routing action. Further, the method includes preparing a SCG failure report. The SCG failure report includes a MN report including the failure type and measurement results related to a MN measurement configuration and a SN report including measurement results related to a SN measurement configuration. After preparing the SCG failure report, the method includes transmitting the SCG failure report to the MN, wherein the MN transmits a SN failure report message to the SN on receiving the SCG failure report to resolve the SCG failure and receives a SN failure report acknowledge message from the SN. Further, the method includes receiving the SN failure report acknowledge message from the MN to perform at least one action on a SCG of the SN, wherein performing the at least one action includes at least one of reconfiguring the SCG, changing the SCG, releasing the SCG and modifying the SCG.

Accordingly the embodiments herein provide a user equipment (UE), wherein the UE is connected to a master node (MN) and a secondary node (SN) in a dual connectivity wireless network. The UE includes a failure detection unit configured to detect a secondary cell group (SCG) failure, wherein the SCG failure is detected by identifying a failure type. Further, the UE includes a processing unit configured to perform a first set of failure actions in response to determining the SCG failure. The first set of failure actions includes at least one of a master cell group (MCG) split signaling radio bearer (SRB) recovery action and a radio resource control (RRC) message routing action. Further, the UE includes a report preparation unit configured to prepare a SCG failure report. The SCG failure report includes a MN report including the failure type and measurement results related to a MN measurement configuration and a SN report including measurement results related to a SN measurement configuration. Further, the UE includes a communication interface unit configured to transmit the SCG failure report to the MN, wherein the MN transmits a SN failure report message to the SN on receiving the SCG failure report to resolve the SCG failure and receives a SN failure report acknowledge message from the SN. Further, the communication interface unit is configured to receive the SN failure report acknowledge message from the MN to perform at least one action on a SCG of the SN, wherein performing the at least one action includes at least one of reconfiguring the SCG, changing the SCG, releasing the SCG and modifying the SCG.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide methods and systems for a user equipment (UE) to transmit a secondary cell group (SCG) failure report to a master node (MN) in a dual connectivity wireless network, wherein the SCG failure report may be used to perform recovery actions on SCG associated with a secondary node (SN) with minimal interruption in data transfer.

Another object of the embodiments herein is to disclose contents and formats of the SCG failure report.

Another object of the embodiments herein is to disclose a method for using a frequency identifier (Access radio frequency number (ARFCN)) for measurement results included in the SCG failure report that may be required by the MN to reconfigure the SCG.

Another object of the embodiments herein is to disclose a method for including beam measurements in the SCG failure report in response to determining a beam failure and a radio link failure (RLF).

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for enabling a user equipment (UE) to report a secondary cell group failure in a dual connectivity wireless network, wherein the dual connectivity wireless network includes a master node (MN) and a secondary node (SN) connected to the UE.

A method disclosed herein includes detecting a secondary cell group (SCG) failure. The SCG failure can be detected by identifying a failure type. In response to detecting the SCG failure, the method includes performing a first set of failure actions. The first set of failure actions can be, but is not limited to, a master cell group (MCG) split signaling radio bearer (SRB) recovery action, a radio resource control (RRC) message routing action, or the like.

Further, the method includes preparing a SCG failure report. The SCG failure report includes a MN report and a SN report. The MN report includes, but not limited to, the failure type, measurement results related to a MN measurement configuration, or the like. The SN report includes, but not limited to, measurement results related to a SN measurement configuration, or the like. Further, the method includes transmitting the SCG failure report to the MN.

On receiving the SCG failure report, the MN transmits a SN failure report message to the SN to resolve the SCG failure and receives a SN failure report acknowledge message from the SN. Further, the method includes receiving the SN failure report acknowledge message by the MN to perform one or more actions on a SCG of the SN. The one or more actions include, but not limited to, reconfiguring the SCG, changing the SCG, releasing the SCG, modifying the SCG, or the like.

Further, the method includes assigning a frequency identifier for the measurement results included in the SCG failure report. The frequency identifier includes at least one of an access radio frequency count number (ARFCN) value and an identifier for identification of bandwidth associated with the measurement results. Furthermore, the method includes including beam measurement results in the SCG failure report by determining a beam failure and a radio link failure (RLF).

Referring now to the drawings, and more particularly to FIGS. 1 through 7, where similar reference characters denote corresponding features consistently throughout the figures, there are shown example embodiments.

Figure 1:
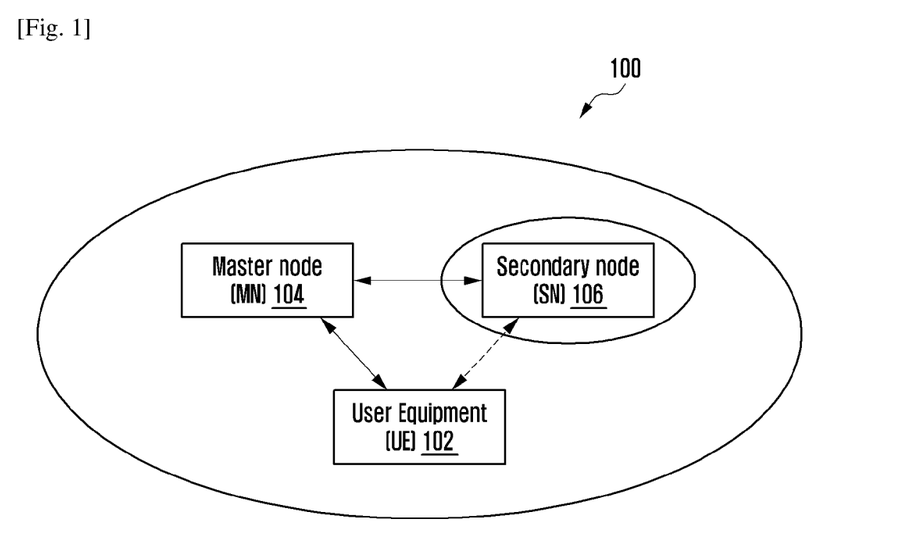
FIG. 1 is an example dual connectivity wireless network illustrating reporting of a secondary cell group (SCG) failure by a user equipment (UE), according to embodiments as disclosed herein.

FIG. 1 is an example dual connectivity wireless network 100 illustrating reporting of secondary cell group (SCG) failure by a user equipment (UE) 102, according to embodiments as disclosed herein.

The dual connectivity wireless network 100 includes a master node (MN) 104 and a secondary node (SN) 106 connected to the UE 102. The UE 102 can be, but is not limited to, a mobile phone, a smartphone, tablet, a phablet, a personal digital assistant (PDA), a laptop, a computer, a wearable computing device, a vehicle infotainment device, an Internet of Things (IoT) device, a Wi-Fi router, a USB dongle, or any other processing devices which can connect to wireless modems or possesses radio frequency (RF) capabilities. The dual connectivity wireless network 100 can include any wireless access network and apparatus that can be or configured to support dual connectivity. The wireless access network can be, but is not limited to, 3rd Generation Partnership Project (3GPP), Long Term Evolution (LTE/ 4G), LTE-Advanced (LTE-A), 3GPP2, Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Wireless Local Area Network (WLAN), Worldwide Interoperability for Microwave Access (WiMAX/IEEE 802.16), Wi-Fi (IEEE 802.11), Evolved-UTRA (E-UTRA), 5G based wireless communication systems, 4G based wireless communication systems, Wi-Fi Direct, Bluetooth, Bluetooth Low Energy (BLE), or the like. For example, the dual connectivity wireless network 100 may include LTE-5G interworking. In the LTE-5G interworking, the LTE acts as the MN 104 and 5G acts as the SN 106 for data offload. The 5G can be connected to the LTE for core network control plane connectivity.

The UE 102 can be configured to operate two Medium Access Control (MAC) entities and two separate Radio Link Control (RLC) entities for each data flow on each of the MN 104 and the SN 106. Further, the UE 102 can be connected to a master cell group (MCG) and a secondary cell group (SCG) through the MN 104 and the SN 106 respectively. The MCG and the SCG can be group of cells associated with the MN 104 and the SN 106 respectively comprising a primary cell (PCell)/primary SCell (PSCell) and optionally one or more Secondary Cells (SCells). The MN 104 can be configured to add or release the SCGs associated with the SN 106. The MN 104 can provide control plane functions and the SN 106 can provide user data plane functions.

The control plane functions involve splitting of user plane traffic at a Packet Data Convergence Protocol (PDCP) layer in the MN 104 and forwarding information about the user plane traffic to lower layers (RLC, MAC, physical layer (PHY)) of the MN 104 and the SN 106. Radio Resource Control (RRC) signals can be forwarded across at least one of the MN 104 and the SN 106. The control plane functions allow the UE 102 to use a set of Signaling Radio Bearers (SRBs) to send RRC messages (control messages) to the dual connectivity wireless network 100. The set of SRBs can be MCG SRBs, split SRBs and SCG SRBs. The MCG SRBs can be direct SRBs between the MN 104 and the UE 102 used for communicating the RRC messages related to the MN 104 that can also embed SNRRC messages. The SCG SRBs can be direct SRBs between the SN 106 and the UE 102 that are used to send the RRC messages related to the SN 106. The split SRBs can be SRBs split between the MN 104 and the SN 106 towards the UE 102. The split SRBs may be used to send the RRC messages related to the MN 104 that can also embed SNRRC messages 104 through the lower layers of at least one of the MN 104 and the SN 106.

Similarly the user data plane functions allow the UE 102 to use Data Radio Bearers (DRBs) for communicating user data to the dual connectivity wireless network 100 (including the MN and the SN). The DRBs can include MCG DRBs, MCG split DRBs, SCG DRBs and SCG split DRBs.

The UE 102 can be further configured to monitor the SCG of the SN 106 and detect a SCG failure. In an embodiment, the UE 102 performs a procedure provided by 3GPP to identify a failure type for the detection of the SCG failure. The failure type can be, but is not limited to, a SN radio link failure, a failure of SN change procedure, an exceeded maximum uplink transmission timing difference, the UE 102 unable to comply with SN configuration, a SN integrity check failure, or the like.

After detecting the SCG failure, the UE 102 performs a set of failure actions. The set of failure actions can be, but is not limited to, a MCG split SRB recovery action, a RRC message routing action, or the like. The UE 102 prepares a SCG failure report in order to notify the MN 104 of the dual connectivity wireless network 100 about one or more cells from which the UE 102 receives good signal strength. The SCG failure report may include a MN report and a SN report. The MN report includes the failure type and measurement results according to a MN measurement configuration. The SN report includes measurement results according to a SN measurement configuration. Further, the SCG failure report may include an access radio frequency number (ARFCN) as a frequency identifier for the measurement results of the SCG cells in the SCG failure report that may be required by the MN 104 to reconfigure the SCG. In addition, the UE 102 includes beam measurement results in the SCG failure report in response to determining a beam failure and a radio link failure (RLF).

Further, the UE 102 transmits the SCG failure report to the MN 104. On receiving the SCG failure report, the MN 104 transmits a SN failure report message to the SN 106 by including a UE identity, the SN report (includes the measurement results according to the SN measurement configuration) and the failure type. After receiving the SN failure report message, the SN 106 transmits a SN failure report acknowledge message to the MN 104 by including information about at least one of a SCG configuration messages and a UE context release command (a SCG release command).

On receiving the SN failure report acknowledge message, the MN 104 sends a reconfiguration message that includes at least one of the SCG configuration message and the SCG release command to the UE 102. Thereby, the UE 102 may able to perform one or more recovery actions on the SCG with minimal interruption in data transfer. The one or more actions can be, but is not limited to, reconfiguring the SCG, changing the SCG, releasing the SCG, modifying the SCG, or the like.

Figure 2:
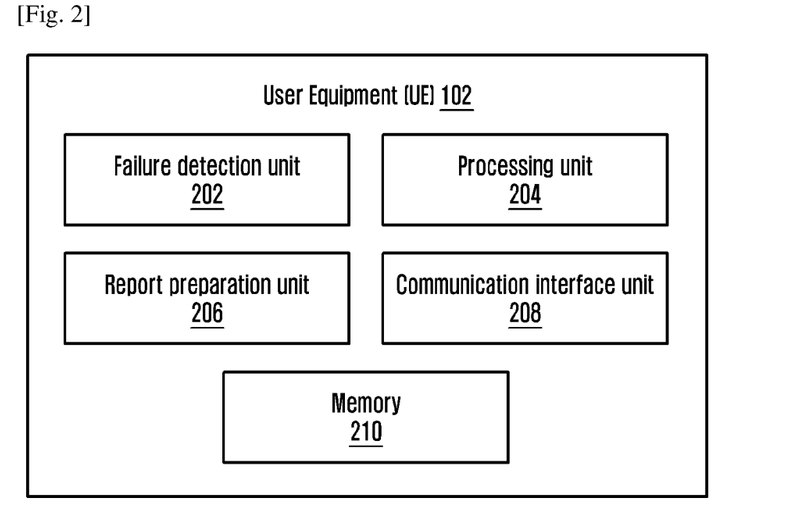
FIG. 2 is a block diagram illustrating units of a UE for reporting a secondary node failure in a dual connectivity wireless network, according to embodiments as disclosed herein.

FIG. 2 is a block diagram illustrating units of the UE 102 for reporting the secondary node failure in the dual connectivity wireless network 100, according to embodiments as disclosed herein.

The UE 102 submits the SCG failure report to the MN 104 in the dual connectivity wireless network 100 and receives the reconfiguration message from the MN 104 to perform one or more actions on the SCG of the SN 106. The one or more actions can be, but is not limited to, reconfiguring the SCG, releasing the SCG, changing the SCG, modifying the SCG, or the like. The UE 102 can be, but is not limited to, a mobile phone, a smartphone, tablet, a phablet, a personal digital assistant (PDA), a laptop, a computer, a wearable computing device, a vehicle infotainment device, an Internet of Things (IoT) device, a Wi-Fi router, a USB dongle, or any other processing devices which can connect to wireless modems or possesses radio frequency (RF) capabilities. The dual connectivity wireless network 100 can include any wireless access network and apparatus that can be or can configured to support dual connectivity. The wireless access network can be, but is not limited to, 3rd Generation Partnership Project (3GPP), Long Term Evolution (LTE/4G), LTE-Advanced (LTE-A), 3GPP2, Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Wireless Local Area Network (WLAN), Worldwide Interoperability for Microwave Access (WiMAX/IEEE 802.16), Wi-Fi (IEEE 802.11), Evolved-UTRA (E-UTRA), 5G based wireless communication systems, 4G based wireless communication systems, Wi-Fi Direct, Bluetooth, Bluetooth Low Energy (BLE), or the like. The UE 102 includes a failure detection unit 202, a processing unit 204, a report preparation unit 206, a communication interface unit 208 and a memory 210.

The failure detection unit 202 can be configured to detect the SCG failure. For detecting the SCG failure, the failure detection unit 202 uses criteria as defined by 3GPP standards to identify the failure type. The failure type can be, but is not limited to, a SN radio link failure, a failure of SN change procedure, an exceeded maximum uplink transmission timing difference, the UE unable to comply with SN configuration, the SN integrity check failure, or the like.

The processing unit 204 can be configured to perform the set of failure actions by receiving information about the SCG failure from the failure detection unit 202. The set of failure actions can comprise the MCG split SRB action, the RRC message routing action and so on.

On receiving the information about the SCG failure, the processing unit 204 can be configured to suspend the SCG DRBs and SCG transmissions for the split DRBs. Also, the processing unit 204 resets a SCG-MAC and re-establishes the RLC entities associated with the SCG. Thereafter, the processing unit 204 checks whether the split SRB is configured. If the split SRB is configured, then the processing unit 204 can be further configured to perform the MCG split SRB action by re-establishing the RLC for a SCG leg of the split SRBs and performing a PDCP data recovery for the split SRBs.

For performing the PDCP data recovery, the processing unit 204 compiles a PDCP status report if a radio bearer is configured to transmit the PDCP status report in an uplink control channel. After compiling the PDCP status report, the processing unit 204 submits the PDCP status report to lower layers (such as RLC entity, MAC and so on) as a first PDCP protocol data unit (PDU) for transmission to the MN 104. Further, if the first PDCP PDU is submitted using a suspended acknowledge mode (AM) RLC entity, the processing unit 204 does not receive acknowledgment for the successful delivery of the first PDCP PDU from the lower layers. When the first PDCP PDU is not successfully delivered, the processing unit 204 performs retransmission of the PDCP PDU to the lower layers using active RLC entities (RLC entities which are not suspended). The PDCP PDU may be re-transmitted in an ascending order of associated count values derived from the first PDCP PDU for which the successful delivery message may not be received by the processing unit 204. Thus, the PDCP data recovery reduces PDCP packet loss which occurs due to re-establishment of the RLC entities associated with the SCG.

In order to perform the RRC message routing action, the processing unit 204 stops transmission of a measurement report intended for the SN 106 and transmits the measurement report to the SN 106 using the MCG SRB. Similarly, after detecting the SCG failure, the processing unit 204 can be configured to discard RRC messages received from a SCG link and originated from the SN 106. Also, the processing unit 204 discards measurement configuration originates from the SN 106. Further, after detecting the SCG failure, the processing unit 204 does not transmit pending RRC response messages for the RRC messages received from the SCG link. The processing unit 204 transmits the pending RRC response messages using the MCG SRB. Thus, the UE 102 transmits the RRC messages and the measurement report using only the MCG SRB after detecting the SCG failure in order to ensure reliability of the RRC signaling.

In an embodiment, the processing unit 204 can be configured to perform an additional set of failure actions based on the failure type related to the SCG failure. When the SCG failure occurs due to a reconfiguration failure, the processing unit 204 discards a new RRC configuration and reuses an older version of a RRC configuration for the SCG. Thus, reducing the signaling overhead to reconfigure the SCG of the SN 106.

When the UE 102 is unable to comply with the SN configuration and a SCG configuration is received on the SCG SRB, the processing unit 204 discards a RRC configuration message received from the SCG SRB and transmits the information about the SCG failure using the MCG SRB.

If the SCG failure is due to the RLF, the processing unit 204 can be further configured to re-route the RRC message intended for the SN 106 through the MCG SRB during a period when RLF timers are running. The processing unit 204 may not be able to use the SCG link to transmit the RRC message during the period when the RLF timers are running. Thus, the RRC messages may be transmitted to the MN 104 using the MCG SRB.

The report preparation unit 206 can be configured to prepare the SCG failure report. The SCG failure report may include the MN report and the SN report. The report preparation unit 206 prepares the MN report by including the failure type and the measurement results according to the MN measurement configuration. In the MN report, if the SCG failure is due to the RLF, the failure type can be set as "SCG RLF detection". If the SCG failure is due to the SCG change failure, the report preparation unit 206 can be configured to set the failure type to "scg-Change Failure" in the MN report. Similarly, if the SCG failure is due to the exceeded maximum uplink (UL) transmission timing difference, the report preparation unit 206 can be configured to set the failure type to "maxUL-TimingDiff" in the MN report. If the SCG failure is due to non-compliance of SCG configuration, the report preparation unit 206 can be configured to set the failure type to "scg-Reconfiguration Failure" and further include UE capabilities that are exceeded due to the SCG configuration in the MN report. Further, if the SCG failure is due to the SCG integrity check failure, the report preparation unit 206 can be configured to set the failure type to "scg-Integrity Check Failure" in the MN report. The measurement results included by the report preparation unit 206 in the MN report further include measurements of SCG cells for each available SCG cell configured according to the MN measurement configuration, measurement results for each non-serving MN radio access technology (RAT) specific frequency configured by the MN 104 and measurement results for each non-serving SN radio access technology (RAT) specific frequency configured by the MN 104. The MN RAT and the SN RAT may be radio access technologies used by the MN 104 and the SN 106 respectively.

The report preparation unit 206 prepares the SN report by including the measurement results according to the SN measurement configuration. The measurement results in the SN report include the measurements of the SCG cells for each available SCG cell configured according to the SN measurement configuration, measurement results of an available best non-serving cell, measurement results for each non-serving MN RAT specific frequency configured by the SN 106 and measurement results for each non-serving SN RAT specific frequency configured by the SN 106. The measurement results of the available best non-serving cell may be included for each SCG frequency for which the SCG cell is configured according to the SN measurement configuration. In addition, when the SCG failure detected is due to the non-compliance of SCG configuration, the report preparation unit 206 then includes a part of the SCG configuration that is not complied by the UE 102 and the UE capabilities that are exceeded due to the SCG configuration in the SCG failure report.

The report preparation unit 206 can be further configured to include the measurement results for best 'N' cells in the MN report and the SN report. The report preparation unit 206 can include the measurement results of cells that are above a signal strength threshold and the measurement results of cells that are above an offset greater than the PS cell. A value of N can be configured by the dual connectivity wireless network 100 or N may be any constant integer value. The threshold and the offset value can be configured by the dual connectivity wireless network 100. Also, the offset value may be a constant integer value.

After preparing the MN report and the SN report, the report preparation unit 206 includes the contents of the MN report within an MN specific RRC message. Similarly, the report preparation unit 206 includes the contents of the SN report within a SN RAT specific container defined in the MN specific RRC message. The report preparation unit 206 provides the MN specific RRC message to the communication unit 208 using the MCG SRB.

In an embodiment, the report preparation unit 206 can be further configured to include a frequency identifier for the measurement results included in the SCG failure report (the MN report and the SN report). The frequency identifier may be, but is not limited to, an access radio frequency number (AFRCN value), an identifier for identification of bandwidth associated with the measurement results, or the like. For each frequency carrier, a list may be used for neighbor cell measurements and a container may be defined for serving cell measurements. Also, the same container format may be used if different containers are defined for the measurement results according to the MN measurement configuration and the SN measurement configuration.

Further, the report preparation unit 206 includes a first set of information for each non-serving frequency (associated with neighbor cells) configured by at least one of the MN 104 and the SN 106. The first set of information includes the frequency identifier (the ARFCN) and a list of 'M' cell measurements in the SCG failure report. The non-serving frequencies can be at least one of Inter-RAT frequency and Intra-RAT frequency. Further, a value of 'M' can be configured using the RRC configuration. Also, the 'M' cell may be pre-defined cells that receive highest signal strength. The list of 'M' cell measurements includes a cell identifier (a physical cell identity) and measurement quantity such as, but not limited to, reference signal received power (RSRP), reference signal received quality (RSRQ), or the like.

Similarly, the report preparation unit 206 includes a second set of information for each SCG serving frequency (associated with serving cells) configured by at least one of the MN 104 and the SN 106. The second set of information includes the frequency identifier (such as the ARFCN), serving cell measurements and a list of 'N' cell measurements. The list of 'N' cell measurements may be neighboring cell measurements and N may be configured using the RRC configuration. Also, the 'N' cell may be pre-defined neighboring cells that receive highest signal strength. The serving cell measurements and the list of 'N' cell measurements include the cell identifier (a physical cell identity) and the measurement quantity such as, but not limited to, reference signal received power (RSRP), reference signal received quality (RSRQ), or the like. Thus, the measurements reported for the SCG serving frequencies and the non serving frequencies can be used for selecting a new SCG configuration and network optimization.

Further, if the list of 'M' cell measurements, the serving cell measurements and the list of 'N' cell measurements are available according to both the MN measurement configuration and the SN measurement configuration, the report preparation unit 206 can be configured to include the measurement quantity in the SCG failure report according to embodiments disclosed herein. According to a first embodiment, the report preparation unit 206 may include the measurement quantity as an average of measurement results computed using the MN measurement configuration and the SN measurement configuration. According to a second embodiment, the report preparation unit 206 may include the measurement quantity as a measurement result computed by the MN measurement configuration. Similarly according to a third embodiment, the report preparation unit 206 may include the measurement quantity as a measurement result computed by the SN measurement configuration. According to a fourth embodiment, the report preparation unit 206 may include the measurement quantity as measurement results computed according to both the MN measurement configuration and the SN measurement configuration by assigning tags to the measurement results. The tags are used to identify whether the measurement results are computed according to MN measurement configuration or the SN measurement configuration. Further, the dual connectivity wireless network 100 may configure priority between the measurement results computed according to the MN measurement configuration and the SN measurement configuration.

In an embodiment, the report preparation unit 206 can be further configured to include beam measurement results in the SCG failure report in response to determining the beam failure and the RLF failure. The report preparation unit 206 applies a layer 3 (L3) beam filtering to include the beam measurement results in the SCG failure report.

In case of the beam failure, the report preparation unit 206 includes information about a cause of beam failure, a candidate beam identified by the UE 102, signal strength (RSRP, RSRQ and so on) of the candidate identifier, number of attempts on beam recovery response and identity of beams used for a downlink control channel and a uplink control channel, or the like. The cause of beam failure can be, but is not limited to, the failure type associated with the SCG failure, a sub-cause of RLF cause, or the like. The candidate beam identified by the UE 102 may be a channel state information (CSI) resource identity. The number of attempts indicates a number of requests that are sent by the UE 102 to get synchronized with one or more beams of each base station (MN 104 and SN 106). The identity of beams used for the uplink control channel may be a Physical Downlink Control Channel (PDCCH) resource identity. The identity of beams used for the downlink control channel may be a PDCCH search space identity.

Further, the report preparation unit 206 provides the beam measurement results according to a measurement report configuration provided by a cell related to the MN 104 and the SN 106 for a given frequency. The report preparation unit 206 can be further configured to include additional information in the SCG failure report for the PS cell, configured SCG cells, neighbor cells reported for the SCG serving frequencies and neighbor cells reported for the non-serving frequencies. The additional information can include available measurement of a best beam, available measurement of best 'N' beams and available beam measurements of at least one of a channel state information reference signal (CSI-RS) and a Synchronization Signal (SS) block. The available measurement of the best beam includes a beam identity (a SS block index) and quality of the beam (RSRP/RSRQ) after applying the L3 beam filtering. Further, the available measurement of the best 'N' beams includes the beam identity and quality of the beam after applying the L3 beam filtering. The dual wireless connectivity network 100 may configure a value of 'N'. Also, the report preparation unit 206 may include at least one of 'N1' CSI-RS beam measurements and 'N2' SS block measurements. The dual wireless connectivity network 100 may configure the values of 'N1' and 'N2'.

The report preparation unit 206 may include the additional information for the PScell, the configured SCG cells, the neighbor cells reported for the SCG serving frequencies and the neighbor cells reported for the non-serving frequencies according to a configuration provided by the dual connectivity wireless network 100. The configuration provided by the dual connectivity wireless network 100 may be applicable for all SCG serving cells or may be provided per SCG serving cell. Also, the configuration provided by the dual connectivity wireless network 100 may be applicable for all SCG serving frequencies or may be provided per SCG serving frequency. Similarly, the configuration provided by the dual connectivity wireless network 100 may be applicable for all non-serving frequencies or can be provided per non-serving frequency.

In an embodiment, the report preparation unit 206 can be further configured to include the beam measurement results in a VarRLFReport by determining a MCG failure. The beam measurements may include information about a cause of beam failure, a candidate beam identified by the UE 102, signal strength (RSRP, RSRQ and so on) of the candidate identifier, number of attempts on beam recovery response and identity of beams used for a downlink control channel and a uplink control channel, or the like. The cause of beam failure can be, but is not limited to, a connection failure type, a sub-cause of RLF cause, or the like. Also, the report preparation unit 206 can be further configured to include additional information in the VarRLFReport for the Pcell, configured MCG cells, neighbor cells reported for the MCG serving frequencies and the neighbor cells reported for the non-serving frequencies. The additional information can include the available measurement of the best beam, the available measurement of best 'N' beams and the available beam measurements of at least one of the CSI-RS and the SS block. Thus, the additional information included in the VarRLFReport can be used for the network optimization. Also, from the beam measurement results, the MN 104 may determine whether the RLF is due to the beam failure or some other cause for taking SCG failure recovery actions.

The report preparation unit 206 provides the SCG failure report to the communication interface unit 208. The communication interface unit 208 transmits the SCG failure report to the MN 104 of the dual connectivity wireless network 100 using the MCG SRB. The SCG failure report transmitted to the MN 104 may be encapsulated within the MN specific RRC message to the MN 104. On receiving the SCG failure report, the MN 104 transmits the SN failure report message to the SN 106. The SN failure report message may include, but is not limited to, the UE identity, the SN report, the failure type, or the like. The UE identity can be, but is not limited to, a cell-radio network temporary identifier (C-RNTI) used in the SCG, an Xn application protocol (XnAP) identifier, or the like. The XnAP identifier may be used to identify UE context within an interface between the MN 104 and the SN 106. The SN report may be included in the SN failure report message only when the MN 104 has received the SN report within the SCG failure report.

Also, the SN failure report message may or may not have a corresponding response message from the SN 106. If the response message is required by the MN 104 from the SN 106, then the MN 104 triggers timer TDC failure. Further, when the timer TDC failure expires before the MN 104 has received a SN failure report acknowledge message, the MN 104 may consider the procedure for transmitting the SN failure report message as being failed and releases the UE context.

After receiving the SN failure report message, the SN 106 transmits the SN failure report acknowledge message to the MN 104. The SN failure report acknowledge message includes the SCG configuration message and the UE context/SCG release command. The SCG configuration message included in the SN failure report acknowledge message may be used to provide updated configuration to the UE 102. Also, the SCG configuration message included in the SN failure report acknowledge message may be used to change the SCG. If the SCG configuration is used to change the SCG, then a message including target SNs may be inserted in the SN failure acknowledge message. The SN 106 may send the SN failure report acknowledge message to the MN 104. The MN 104 may further send the SN failure report acknowledge message using the MCG SRB to the communication interface unit 208 of the UE 102. The SN failure report acknowledge message transmitted to the communication interface unit 208 may be encapsulated within the MN specific RRC message.

The communication interface unit 208 can be further configured to receive the SN failure report acknowledge message from the MN 104 to perform the one or more actions on the SCG. If the communication interface unit 208 receives the SCG configurations, the actions performed may include, but not limited to, reconfiguring the SCG, changing the SCG, modifying the SCG, or the like. If the communication interface unit 208 receives the SCG release command, the SCG may be released. Thus, the SCG failure recovery can be performed reliably and with minimal UE performance impact.

The memory 210 can be configured to store the SCG failure report and the SCG configuration message/release commands. The memory 210 may include one or more computer-readable storage media. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted to mean that the memory 210 is non-movable. In some examples, the memory 210 can be configured to store larger amounts of information than the memory. In certain examples, a non-transitory storage medium may store data that can, over time, change (e.g., in Random Access Memory (RAM) or cache).

FIG. 2 shows exemplary units of the UE 102, but it is to be understood that other embodiments are not limited thereon. In other embodiments, the UE 102 may include less or more number of units. Further, the labels or names of the units are used only for illustrative purpose and does not limit the scope of the embodiments herein. One or more units can be combined together to perform same or substantially similar function in the UE 102.

Figure 3:
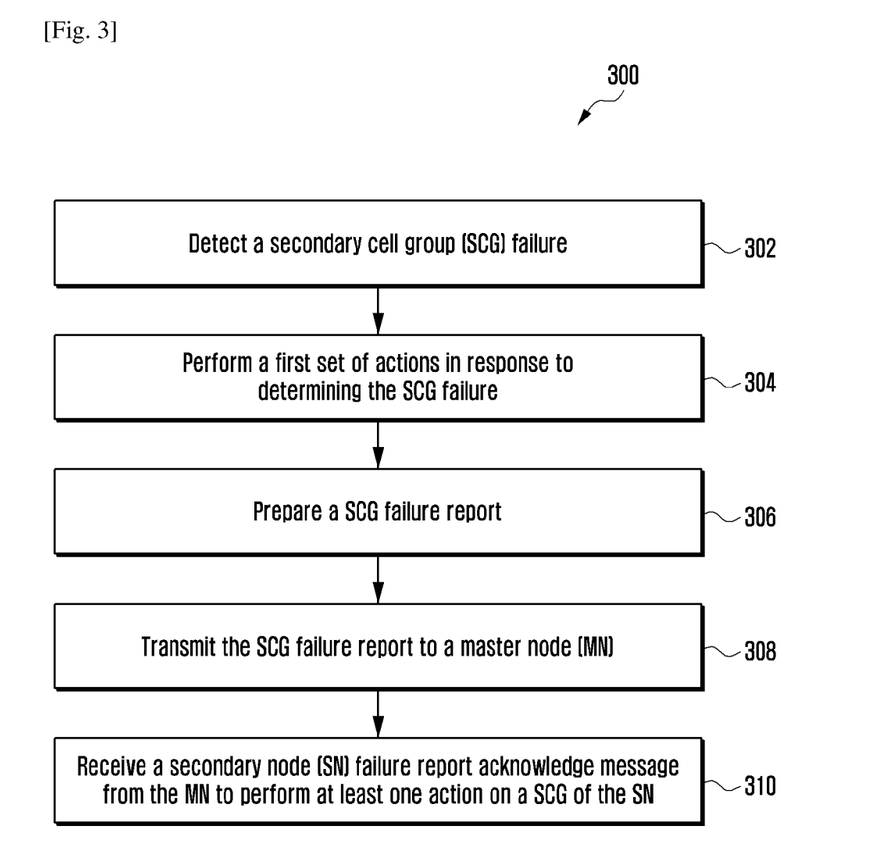
FIG. 3 is a flow diagram illustrating a method for reporting a secondary node failure by a UE in a dual connectivity wireless network, according to embodiments as disclosed herein.

FIG. 3 is a flow diagram illustrating a method for reporting the secondary node failure by the UE 102 in the dual connectivity wireless network 100, according to embodiments as disclosed herein.

At step 302, the method includes detecting the SCG failure. The method allows the failure detection unit 202 to detect the SCG failure. The SCG failure may be detected in accordance with the procedure defined in 3GPP by identifying the failure type. The failure type can be, but is not limited to, a SN radio link failure, a failure of SN change procedure, an exceeded maximum uplink transmission timing difference, the UE 102 unable to comply with SN configuration, the SN integrity check failure, or the like.

At step 304, the method includes performing a first set of failure actions in response to determining the SCG failure. The method allows the processing unit 204 to perform the first set of failure actions in response to determining the SCG failure. The first set of actions includes the MCG split SRB recovery procedure and the RRC message routing procedure. By detecting the failure detection, the RLC entities associated with the SCG may be re-established by the processing unit 204. In order to reduce the PDCP packet loss due to re-establishment of the RLC entities, the processing unit 204 may perform the MCG split SRB recovery action. The MCG split SRB recovery procedure involves reestablishing the RLC entity for the SCG leg of the split SRBs and performing the PDCP data recovery for the split SRBs. The RRC message routing procedure involves terminating the transmission of the measurement report intended for the SN 106 and transmitting the measurement reports to the SN 106 using the MCG SRB. Also, a second set of failure actions can be performed in response to determining that the SCG failure is due to the reconfiguration failure. The second set of failure actions involves discarding the new RRC configuration received from the SCG SRB and reusing the RRC configuration received from the SCG SRB prior to detecting the SCG reconfiguration failure. Thus, the first and the second set of failure actions suspend the SCG connection with the UE 102.

At step 306, the method includes preparing the SCG failure report. The method allows the report preparation unit 206 to prepare the SCG failure report. The SCG failure report may include the MN report and the SN report. The MN report may include the failure type and the measurement results according to the MN measurement configuration. The failure type can be included in the report preparation unit 206 in order to enable self-optimizing network functionality. The MN report can be encapsulated within the MN specific RRC message for transmission to the MN 104. The SN report may include the measurement results according to the SN measurement configuration. The SN report can be included in the container defined in the MN specific RRC message for transmission to the MN 104. Also, the MN specific RRC message can be transmitted to the MN 104 using the MCG SRB. In an embodiment, the frequency identifier (the ARFCN value) can be used for the measurement results included in the SCG failure report. Further, the SCG failure report may comprise the beam measurement results for the determined beam failure and RLF. Thus, the UE 102 may send the SCG failure report including the measurement results that can be understood by the MN 104 for performing the SCG failure recovery actions.

At step 308, the method includes transmitting the SCG failure report to the MN 104. The method allows the communication interface unit 208 to transmit the SCG failure report to the MN 104. The SCG failure report may be transmitted by sending the MN specific RRC message to the MN 104 using the MCG SRB. On receiving the SCG failure report, the MN 104 transmits the SN failure report message to the SN 106. Further, the MN 104 receives the SN failure report acknowledge message from the SN 106. The SN failure report message may include the UE identity, the SN report and the failure type. The SCG failure report acknowledge message may include at least one of the SCG configuration message and the SCG release command.

At step 310, the method includes receiving the SCG failure report acknowledge message from the MN 104 to perform one or more actions on the SCG. The method allows the communication interface unit 208 to receive the SCG failure report acknowledge message from the MN 104 to perform one or more actions on the SCG. The one or more actions may include reconfiguring the SCG, releasing the SCG, changing the SCG, modifying the SCG and so on. Thus, the appropriate actions can be performed by the UE for recovery of the SN without any extra delay and with minimal interruption in the data transfer.

The various actions, acts, blocks, steps, or the like in the method and the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
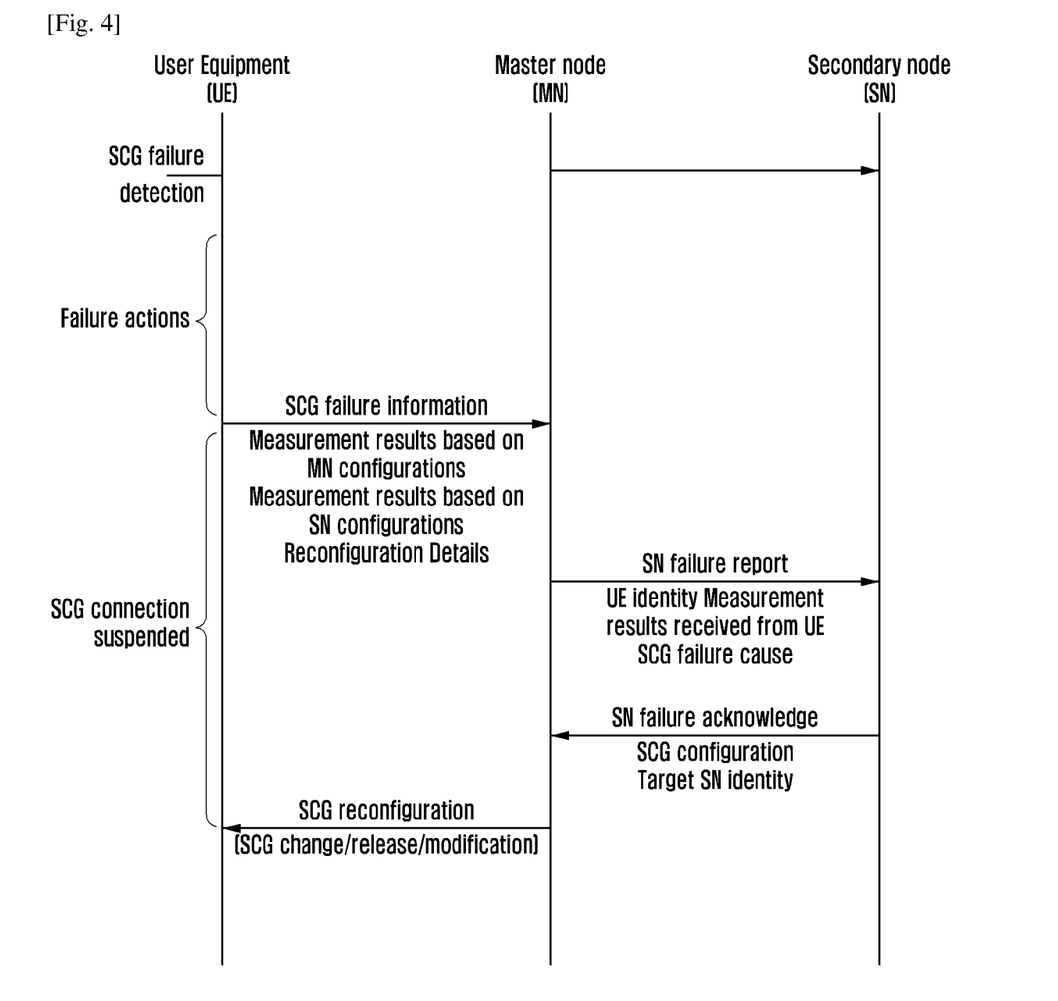
FIG. 4 is an example sequence diagram illustrating reporting of a secondary cell group (SCG) failure in a dual connectivity wireless network, according to embodiments as disclosed herein.

FIG. 4 is an example sequence diagram illustrating reporting of the secondary node failure by a UE to a MN in the dual connectivity wireless network 100, according to embodiments as disclosed herein.

Embodiments herein allow the UE to transmit the measurements results to the MN in response to detecting the SCG failure. The measurement results can be understood by the MN for reconfiguring or changing the SN connection. As illustrated in FIG. 4, the SCG failure may be detected by the failure detection unit 202 of the UE. The set of failure actions can be performed by the processing unit 204 to change the configuration of routing of the RRC messages and other RRC message discard functionalities to ensure reliability of the RRC signaling.

After performing the set of failure actions, the UE transmits the SCG failure information to the MN. The SCG failure information can be prepared by the report preparation unit 206 by including the measurement results according to the MN measurement configuration, the measurement results according to the SN measurement configuration and reconfiguration failure details including the failure type. Further, as the SCG connection is suspended after detecting the SCG failure, the SCG failure information may be transmitted to the MN using the MCG SRBs.

After receiving the SCG failure information, the MN submits the SN failure report to the SN. The SN failure report includes the UE identity, the measurement results according to the SN measurement configuration and the failure type. On receiving the SN failure report, the SN transmits the SN failure report acknowledge message to the MN. The SN failure report acknowledge message includes at least one of the SCG configuration message and the SCG release command. The SN may also include information about the target SNs for changing the SCG in the SCG configuration message. The MN transmits the SCG reconfiguration message to the UE to change or modify or release the SCG associated with the SN.

Figure 5:
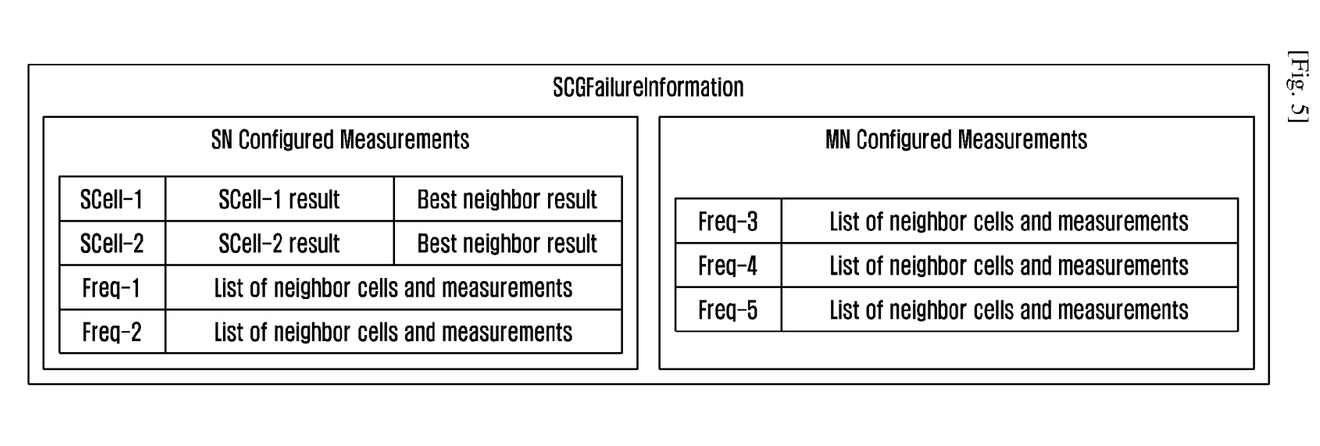
FIGS. 5 and 6 illustrate example formats of a SCG failure report, according to embodiments as disclosed herein.
Figure 6:
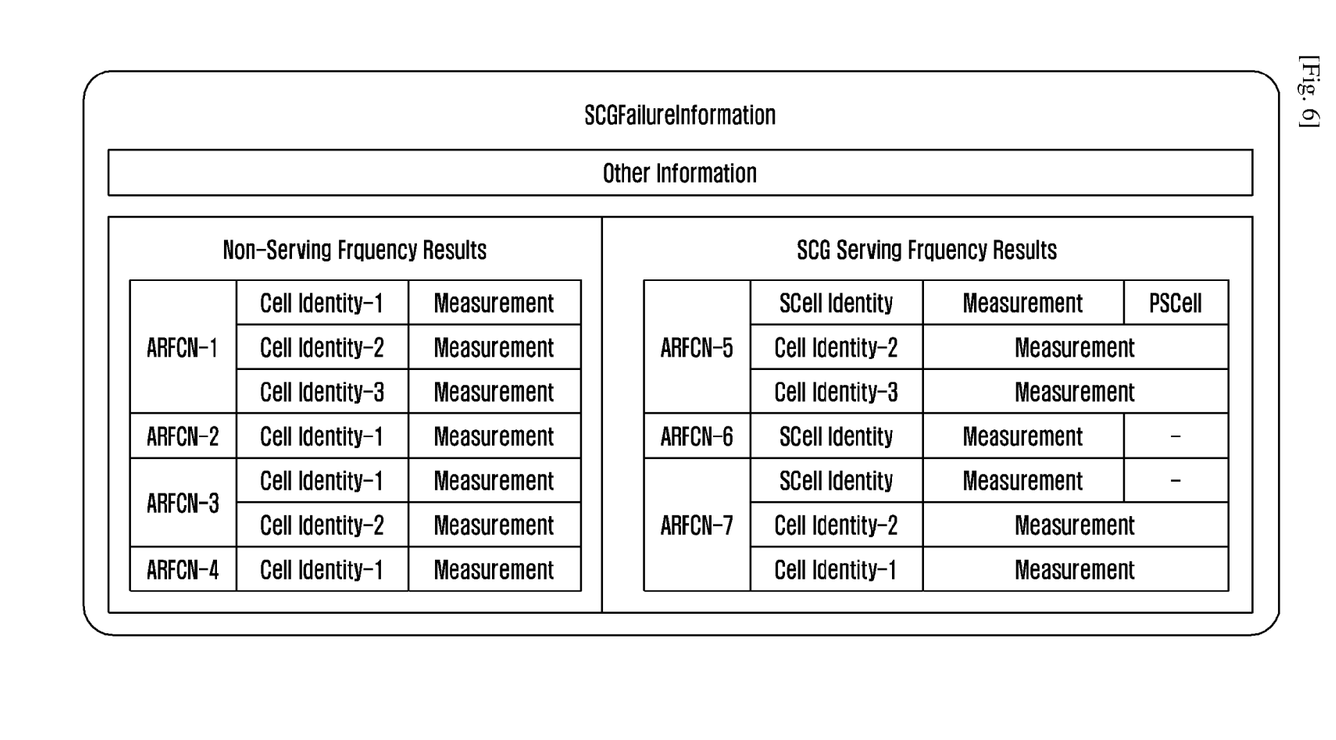

FIGS. 5 and 6 illustrate example formats of a SCG failure report, according to embodiments as disclosed herein.

FIG. 5 illustrates an example SCG failure report format including the SN report and the MN report. The SN report may include SN configured measurements. As illustrated in FIG. 5, the SN report includes the measurement results of the SCG cells SCell-1 and SCell-2 for each available SCG cell (Scell-1 and Scell-2) that is configured according to the SN measurement configuration. Also, the measurement results of the best neighbor cells may be provided for the Scell-1 and Scell-2 in the SN report. Further, a list of neighbor cells (non-serving cells) and the measurement results related to the neighbor cells may be provided for non-serving frequencies freq-1 and freq-2 in the SN report.

The MN report may include MN configured measurements. As illustrated in FIG. 5, the MN report includes a list of neighbor cells (non-serving cells) and the measurement results for non-serving frequencies freq-1, freq-2, freq3 and so on associated with the neighbor cells.

FIG. 6 illustrates an example SCG failure report format including the measurement results for the non-serving frequencies and the SCG serving frequencies. As illustrated in FIG. 6, the measurement results for the non-serving frequencies include the frequency identifier and the cell identity. The measurement results can be included in the SCG failure in accordance with at least one of the MN measurement configuration and the SN measurement configuration by the report preparation unit 206. Also, the frequency identifier may be used to identify the frequencies for which a measurement report is included. For example, frequency identifier ARFCN-1 may be provided for the measurement results of the cells identified by cell identity-1, cell identity-2 and cell-identity-3, which are operating on the frequency identified by ARFCN-1. Frequency identifier ARFCN-2 may be provided for the measurement results of cell identified by cell identity-1, which is operating on the frequency identified by ARFCN-2. Frequency identifier ARFCN-3 may be provided for the measurement results of cells identified by cell identity-1 and cell identity-2, which are operating on the frequency identified by ARFCN-3. Frequency identifier ARFCN-4 may be provided for the measurement results of cell identified by cell identity-1, which is operating on the frequency identified by ARFCN-4.

Similarly, the measurement results for the SCG serving frequencies include the frequency identifier and the cell identity value. The frequency identifier may be used to identify the frequencies for which measurement report is included. The frequency identifier can be the AFRCN value of a serving SCG cell. For example, ARFCN-5 may be provided for the measurement results of the SCell and cells identified by cell identity-2 and cell identity-3, which are operating on the frequencies identified by ARFCN-5. ARFCN-6 may be provided for the measurement results of the SCell, which is operating on the frequencies identified by ARFCN-6. ARFCN-7 may be provided for the measurement results of the SCell and cells identified by cell identity-1 and cell identity-2, which are operating on the frequencies identified by ARFCN-7. Thus, the MN 104 may able to understand the measurement results of the frequencies of SCG SCells from the frequency identifier (ARFCN-5, ARFCN-6, ARFCN-7) included, which is used for changing the SCG of the SN 106.

The embodiments disclosed herein can be implemented through at least one software program running on at least one hardware device and performing network management functions to control the elements. The elements shown in FIG. 2 and FIG. 3 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method for transmitting information by a user equipment (UE) in a dual connectivity wireless network, the method comprising:
identifying a secondary cell group (SCG) failure for a secondary node (SN);
obtaining SCG failure information including a master node (MN) report and a SN report, wherein the MN report includes a first measurement result for at least one SN radio access technology (RAT) specific frequency configured by a MN configuration and a failure type for the SCG failure, and the SN report includes a second measurement result for at least one SN RAT specific frequency configured by a SN configuration; and
transmitting, to the MN, the SCG failure information.

2. The method of claim 1, wherein the second measurement result and the failure type for the SCG failure are transmitted to the SN via the MN.

3. The method of claim 1, wherein the first measurement result includes an access radio frequency count number (ARFCN) value corresponding to the at least one SN RAT specific frequency configured by the MN configuration, and wherein the second measurement result includes the ARFCN value corresponding to the at least one SN RAT specific frequency configured by the SN configuration.

4. The method of claim 1, further comprising:
in case that the UE is unable to comply with a radio resource control (RRC) configuration received over a SCG signaling radio bearer (SRB), continuously using the RRC configuration prior to reception of a RRC reconfiguration message; and
initiating a SCG failure information procedure to report SCG reconfiguration error.

5. The method of claim 1, wherein the second measurement result includes a measurement result for a serving cell and a best measured neighbor cell.

6. The method of claim 1, wherein the SCG failure is associated with at least one of a radio link failure (RLF), a SCG change failure, an exceeding maximum UL Tx timing difference, or a SCG integrity check failure.

7. A method for receiving information by a base station corresponding to a master node (MN) in a dual connectivity wireless network, the method comprising:
receiving, from a user equipment (UE), secondary cell group (SCG) failure information including a MN report and a SN report, wherein the MN report includes a first measurement result for at least one secondary node (SN) radio access technology (RAT) specific frequency configured by a MN configuration and a failure type for the SCG failure, and the SN report includes a second measurement result for at least one SN RAT specific frequency configured by a SN configuration; and
transmitting, to the SN, the second measurement result and the failure type for the SCG failure.

8. The method of claim 7, the second measurement result includes a measurement result for a serving cell and a best measured neighbor cell.

9. The method of claim 7, wherein the first measurement result includes an access radio frequency count number (ARFCN) value corresponding to the at least one SN RAT specific frequency configured by the MN configuration, and wherein the second measurement result includes the ARFCN value corresponding to the at least one SN RAT specific frequency configured by the SN configuration.

10. The method of claim 7, wherein the SCG failure is associated with at least one of a radio link failure (RLF), a SCG change failure, an exceeding maximum UL Tx timing difference, or a SCG integrity check failure.

11. A user equipment (UE) for transmitting information in a dual connectivity wireless network, the UE comprising:
a transceiver; and
a controller coupled with the transceiver and configured to control to:
identify a secondary cell group (SCG) failure for a secondary node (SN),
obtain SCG failure information including a master node (MN) report and a SN report, wherein the MN report includes a first measurement result for at least one SN radio access technology (RAT) specific frequency configured by a MN configuration, and a failure type for the SCG failure, and the SN report includes a second measurement result for at least one SN RAT specific frequency configured by the SN configuration, and
transmit, to the MN, the SCG failure information.

12. The UE of claim 11, wherein the controller is configured to:
in case that the UE is unable to comply with a radio resource control (RRC) configuration received over a SCG signaling radio bearer (SRB), continuously use the RRC configuration prior to reception of a RRC reconfiguration message, and
initiate a SCG failure information procedure to report SCG reconfiguration error.

13. The UE of claim 11, wherein the first measurement result includes an access radio frequency count number (ARFCN) value corresponding to the at least one SN RAT specific frequency configured by the MN configuration, and wherein the second measurement result includes the ARFCN value corresponding to the at least one SN RAT specific frequency configured by the SN configuration.

14. A base station corresponding to a master node (MN) for receiving information in a dual connectivity wireless network, the base station comprising:
a transceiver; and
a controller coupled with the transceiver and configured to control to:
receive, from a user equipment (UE), secondary cell group (SCG) failure information including a MN report and a SN report, wherein the MN report includes a first measurement result for at least one secondary node (SN) radio access technology (RAT) specific frequency configured by a MN configuration and a failure type for the SCG failure, and the SN report includes a second measurement result for at least one SN RAT specific frequency configured by a SN configuration, and
transmit, to the SN, the second measurement result and the failure type for the SCG failure.

15. The base station of claim 14, wherein the first measurement result includes an access radio frequency count number (ARFCN) value corresponding to the at least one SN RAT specific frequency configured by the MN configuration, and wherein the second measurement result includes the ARFCN value corresponding to the at least one SN RAT specific frequency configured by the SN configuration.

* * * * *